Figure 1:
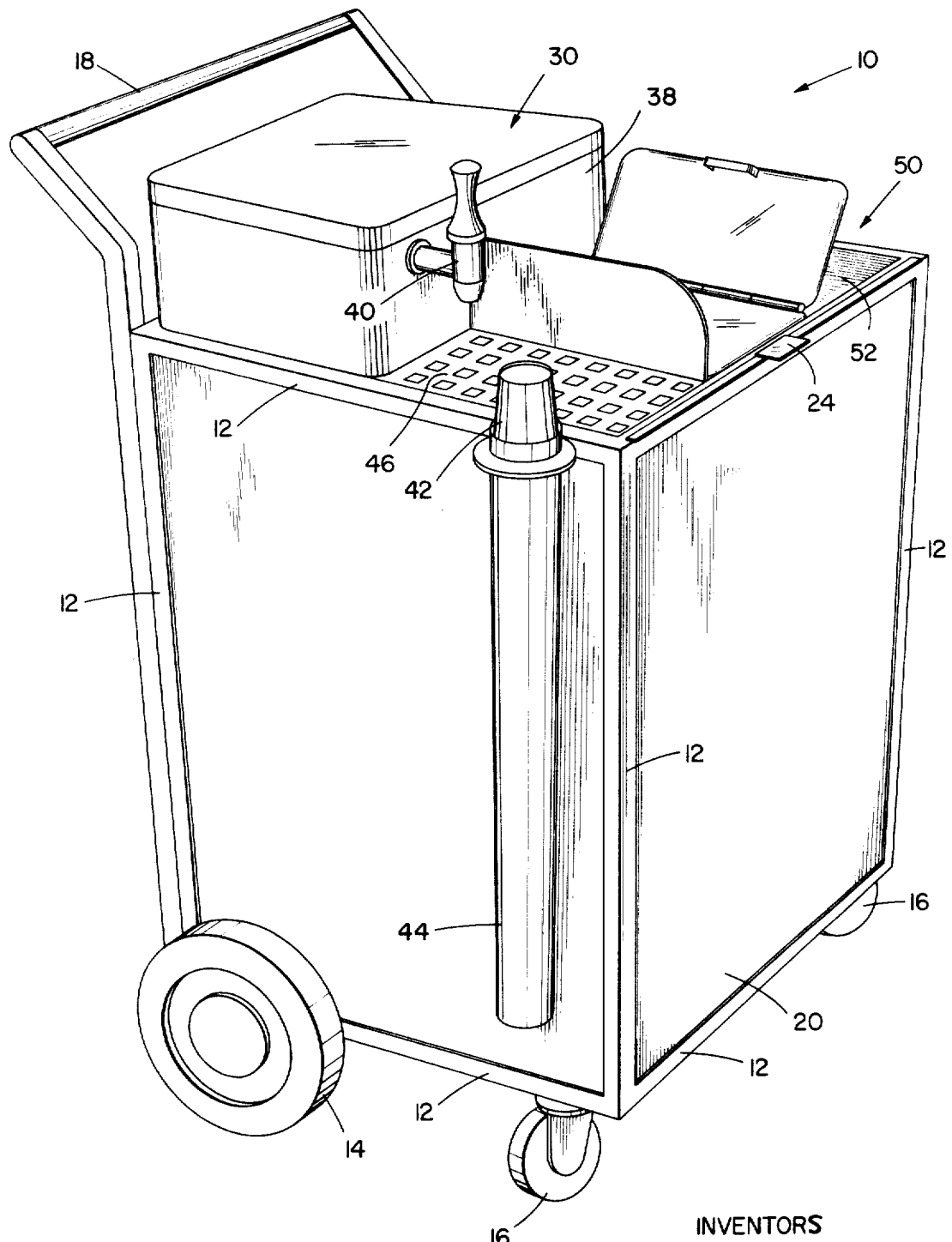

United States Patent

Fogle, Jr. et al.

[15] 3,677,173
[45] July 18, 1972

[54] STEAMER AND SODA-DISPENSING SYSTEM

[72] Inventors: William A. Fogle, Jr., 3008 Dunmurray Road; Joseph B. Jason, 3018 Liberty Parkway; Richard A. Head, 2239 Searles Road, all of Baltimore, Md. 21222

[22] Filed: Aug. 3, 1970

[21] Appl. No.: 60,327

[52] U.S. Cl. .................................. 99/357, 126/37, 222/146
[51] Int. Cl. ..................................................... A47j 39/02
[58] Field of Search ................... 99/357, 283, 288, 290, 327, 99/333; 126/20, 37; 221/150; 222/108, 132, 146, 394, 399

[56] References Cited

UNITED STATES PATENTS

| | | | |
|---|---|---|---|
| 2,948,798 | 8/1960 | Ness | 126/37 X |
| 3,083,450 | 4/1963 | Harvey | 99/288 |
| 3,155,212 | 11/1964 | Hines | 99/290 X |
| 3,232,489 | 2/1966 | Buffington | 222/108 |
| 3,289,664 | 12/1966 | Hewitt | 126/37 |
| 3,327,902 | 6/1967 | Alterwitz | 222/146 X |
| 3,566,769 | 3/1971 | Le Fever | 99/288 |

*Primary Examiner*—Walter A. Scheel
*Assistant Examiner*—Arthur O. Henderson
*Attorney*—Walter G. Finch

[57] ABSTRACT

A steamer and soda-dispensing system includes an enclosed housing having removable side panels and is provided with rollers for portability. A handle is mounted on an upper portion of the housing to facilitate manual control and movement of the housing. Pressurized soda containers are positioned inside the housing and feed soda through a cooling unit to a manually operated dispensing faucet. A burner and an associated fuel tank are located inside of the housing and facilitate the heating of a steaming unit for cooking hot dogs and the like. A cup dispenser and facilities for supporting mustard and catchup containers are included with the housing.

10 Claims, 2 Drawing Figures

Patented July 18, 1972

3,677,173

2 Sheets-Sheet 1

INVENTORS
WILLIAM A. FOGLE JR.
JOSEPH B. JASON
RICHARD A. HEAD
BY
*Walter G. Finch*
ATTORNEY Patented July 18, 1972

3,677,173

2 Sheets-Sheet 2

STEAMER AND SODA-DISPENSING SYSTEM

This invention relates generally to a steamer and soda-dispensing system, and more particularly it pertains to a portable unit for transporting and dispensing soda and steaming hot dogs and the like.

During athletic contests, parades and other types of events where crowds of people gather, it is common to see vendors selling soda and hot dogs to the people. However, the equipment used to transport the soda and hot dogs are separate, bulky and heavy. Many vendors are required to cover relatively small areas and usually must make several trips to a central location to replenish depleted supplies of soda and food. In addition, the present units are restricted to the handling of one item, soda or food. For example, portable soda dispensers are rare and the vendors usually carry the soda in cups with ice rather than transporting a dispenser. Hot food units are available, but are bulky, heavy, and difficult to manage.

Due to the disadvantages of the individual soda dispensers and the hot food units, the combining of such presently available units would only compound the handling difficulties and would require additional vendors to maneuver and operate the combined units. In addition, where vendors are required to move over rough and uneven terrain, the handling problems become almost insurmountable.

It is an object of this invention, therefore, to provide a portable, easy to handle steamer and soda-dispensing system.

Another object of this invention is to provide a unit for supporting a soda-dispenser and a cooker for portability to permit a vendor to move about with relative ease while selling cold soda and cooked foods such as hot dogs and the like.

Still another object of this invention is to provide a portable steamer and soda-dispensing unit which can be moved over relatively rough terrain by a single operator.

A further object of this invention is to provide a steamer and soda-dispensing unit which is easily dismantled and reassembled to facilitate cleaning of and replacing of parts for the unit.

Figure 2:
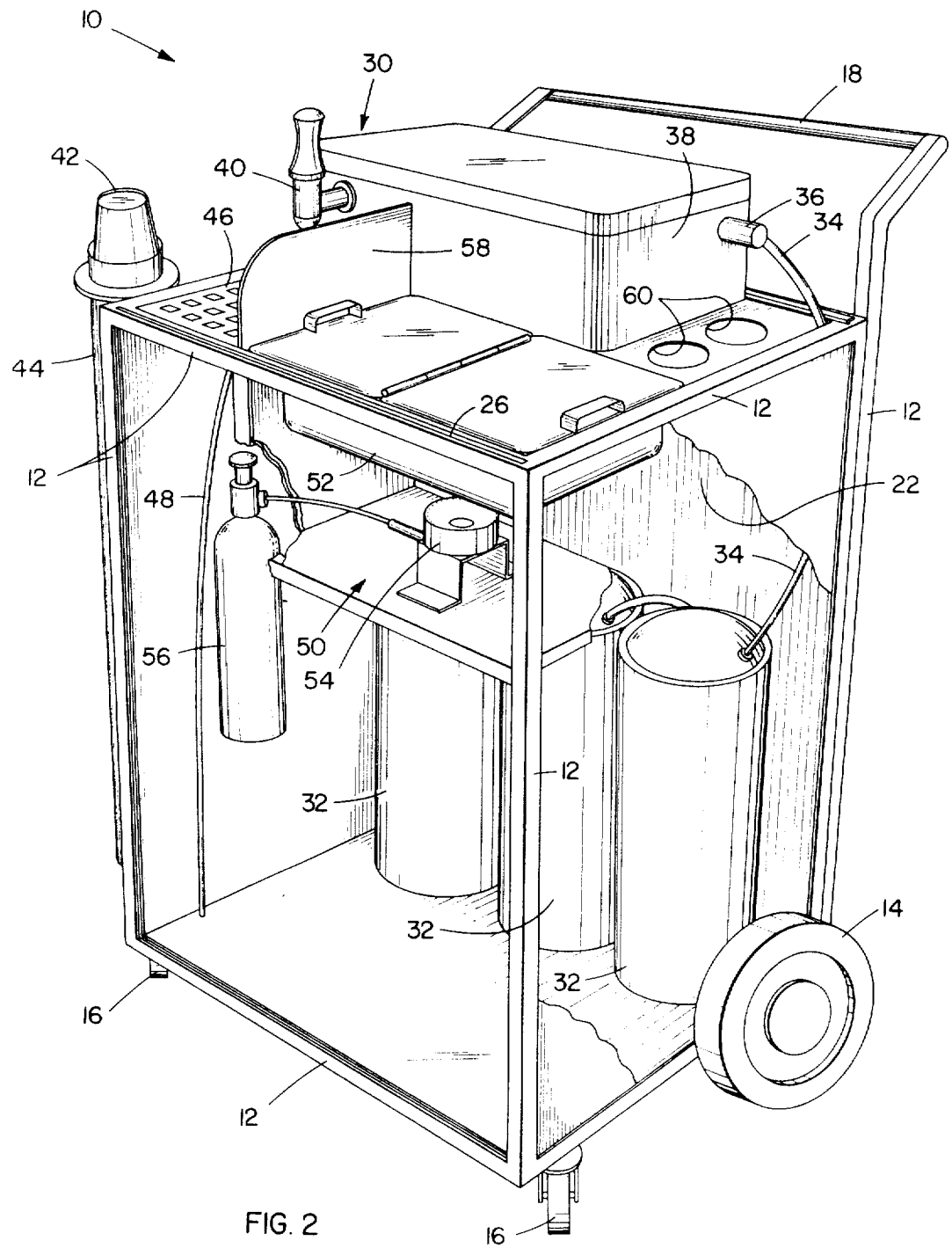

Other objects and attendant advantages of this invention will become more readily apparent and understood from the following detailed specification and drawings in which:

FIG. 1 is a perspective view of a steamer and soda-dispensing unit incorporating features of this invention; and FIG. 2 is a perspective view of the steamer and soda-dispensing unit with portions of the structure broken away and other parts of the structure removed for clarity.

As illustrated in FIG. 1, a steamer and soda-dispensing unit 10 includes a box-like frame 12 supported on a pair of large rubber wheels 14 on opposite sides of a rear portion thereof and small rollers 16 on the underside of a front portion thereof. A handle 18 is mounted on a rear, upper portion of the frame 12 to facilitate manual maneuvering of the unit 10. Panels are mounted in the side portions and a floor is mounted in the base of the frame 12. The frame 12 also supports an easily removable front panel 20.

As illustrated in FIG. 2, a rear panel 22 is mounted removably in the rear of the frame 12 and can be easily removed to permit access to an enclosure or housing formed by the frame, floor and the front, rear, and side panels. The panel 20 (FIG. 1) is formed with a handle 24 (FIG. 1) to permit easy insertion and removal of the panel into and out of, respectively, a slot 26 formed in the forward, vertical portion of the frame 12. The rear panel 22 is provided with similar facilities and mounted similarly to facilitate easy movement of the panel relative to the frame 12. The maneuverability of the panels 20 and 22 permits ready access to the enclosure or housing for storage purposes or replacement of facilities within the housing.

A soda-dispensing and cooling system 30 is mounted on a portion of an upper level of the frame 12 and is supplied soda from a plurality of pressurized containers 32 through a tube 34. The containers 32 are connected in a conventional manner to supply soda upon demand through one or more tubes represented by the tube 34. It is to be understood that this arrangement is well known and head not be explained in detail.

The tube 34 is connected to an inlet connector of a commercially available cooling unit 38. The cooling unit 38 includes a coil-type, soda-circulating system which is surrounded by ice to cool the soda as it passes through the system.

A manually controlled faucet 40 provides a soda outlet for the cooled soda from the cooling unit 38. A supply of cups 42 are mounted on the side of the frame 12 adjacent to the faucet 40 and within a storage dispenser 44 which normally urges the cups upwardly. This provides easy access for the vendor when soda is being served. A drain plate 46 directs spillage of the soda into a funnel system which includes at the base thereof a disposal tube 48. The tube 48 thereby directs overflow and spillage of soda away from the steamer and soda-dispensing unit 10.

A steamer 50, or hot dog cooking system, is mounted in another portion of the upper level of the frame 12 and includes a commercially available double-doored, steaming unit 52 which includes a middle tray for supporting foods, such as hot dogs, to be prepared by steam. Water is placed in the unit 52 below the tray and a cork-type float arrangement is visible externally of the unit to provide an indication of the water level to the vendor-operator of the unit 10.

The cooking system 50 further includes a burner 54 which is mounted on a shelf within the housing of the unit 10 and directly below, but spaced from the bottom side of the steaming unit 52. A removable gas-fuel container 56 of a relatively well known, lightweight size is connected through a tube to the burner 54. The container 56 supplies the fuel, such as propane, necessary to provide the flame which heats the water in the steaming unit 52 and thereby steam-cooks the food.

A partition 58 is mounted on the external upper side of the housing and separates the soda-dispensing area from the hot dog serving area to prevent spillage of the product of one area into the other. A pair of openings 60 are formed in a rear, upper surface of the housing to provide support for the mustard and catchup container. This provides an easily accessible area for applying food dressing to the hot dogs as they are served by the vendor-operator.

The entire structure of the steamer and soda-dispensing unit 10 is made of lightweight, sturdy metals, such as aluminum and stainless steel. An example of the size of the typical unit 10 would be 24 inches wide, 28 inches deep, and approximately 33½ inches in height. The enclosure of the housing provides substantial storage area for supplies such as spare soda containers 32, hot dogs, rolls, cups 42 and other necessities to maintain continuous operation of the unit 10 for long periods of time without returning to a central supply location.

The large rubber wheels 14 permit the unit 10 to be tilted back for movement from one location to another so that the vendor-operator can move about freely without restrictions of terrain and distance. The lightweight features and easy disassembly of the components of the unit 10 provide a system which is easy to clean and maintain.

Obviously many modifications and variations of the present invention are possible in light of the above teachings. It is, therefore, to be understood that within the scope of the appended claims the invention may be practiced otherwise than as specifically described.

What is claimed is:

1. A steamer and soda-dispensing system, comprising, self-contained means for steaming foods to cook the foods for edible consumption, self-contained means for dispensing soda into a container, means for supporting the steaming means and the soda-dispensing means commonly to provide ready access to the steaming means and the soda-dispensing means for a vendor, portability means for permitting the system to be moved about with ease to serve soda and steamed foods to individuals in different locations, and self-contained means enclosed independently of said supporting means for cooling the soda only immediately prior to its being dispensed.

2. A steamer and soda-dispensing system as recited in claim 1, wherein the means for steaming foods includes, a container partially filled with water, a tray for supporting food located above the water, within the container, a burner mounted below the container and internally of the supporting means and a fuel supply contained within the supporting means which supplies fuel to the burner from within the supporting means to provide a flame for heating the water to produce the steam by a completely self-contained fuel-burner system.

3. A steamer and soda-dispensing system as recited in claim 1, wherein the soda-dispensing means includes at least one pressurized container of soda and means for releasing selectively selected amounts of the soda from the container, said soda-cooling means being interposed between said pressurized container of soda and said releasing means so that only the selected amounts of soda being released are cooled.

4. A steamer and soda-dispensing system as recited in claim 1, wherein the supporting means includes a box-like frame, panels assembled in the front, rear and side sections of the frame, a floor assembled in the frame whereby the panels and the frame form an enclosure, and said frame being formed with a slot in one planar portion thereof for receiving at least one of the panels so that the received panel can be easily and completely withdrawn from the area of the frame to permit complete and free access to storage areas and portions of the steaming and soda-dispensing means.

5. A steamer and soda-dispensing system as recited in claim 1, comprising, drainage means located means located adjacent to an area whereat soda is dispensed into a container for collecting and directing away from the system any excess soda which may result when soda is dispensed into a container, and means for preventing any portions of excess soda from spilling onto said steaming means.

6. A steamer and soda-dispensing system as recited in claim 1, wherein the portability means includes two large rubber wheels mounted on a common axis and on lower, opposite sides of the supporting means near a rear portion thereof and handle means mounted on a rear, upper portion of the supporting means where the handle means is used to tilt the supporting means where the handle means is used to tilt the supporting means to the rear about the axis of the wheels and where the large side-mounded rubber wheels permit a vendor to move the system about freely.

7. A steamer and soda-dispensing system as recited in claim 1, wherein the soda cooling means includes a coiled soda-circulating system surrounded by ice which cools the soda as it passes through the soda-circulating system on its way to being dispensed into the container.

8. A self-contained steamer and soda-dispensing system, comprising, a box-like frame, panels assembled in the front, rear and side sections of the frame, a floor assembled in the base of the frame whereby the frame, panels and floor form an enclosure, a food steaming unit supported in a portion of an upper level of the frame, a soda-dispensing unit supported in another portion of the upper level of the frame, a pressurized containers of soda located within the enclosure and connected to the soda-dispensing unit for supplying soda upon demand, a burner supported within the enclosure adjacent to the steaming unit, a container of fuel contained within the enclosure for providing fuel to the burner from within the enclosure to facilitate heating of the steaming unit, said frame being formed with a slot in one planar portion thereof for receiving at least one of the panels so that the received panel is easily removable to provide easy access to the enclosure.

9. A STEAMER AND SODA-disensing system as recited in claim 8, comprising, wheels mounted on the frame for providing portability of the system.

10. Asteamer and soda-disensing system as recited in claim 8, comprising, means supported in still another portion of the upper level of the frame and interposed in a soda flow path between the pressurized containers and the soda disensing unit for cooling only the soda being disensed.

10. A steamer and soda-dispensing system as recited in claim 8, comprising, means supported in still another portion of the upper level of the frame and interposed in a soda flow path between the pressurized containers and the soda dispensing unit for cooling only the soda being dispensed.

* * * * *